(12) United States Patent
Willat

(10) Patent No.: US 6,409,374 B1
(45) Date of Patent: Jun. 25, 2002

(54) BEVERAGE TASTING VESSEL WITH AERATING RIDGES AND AGITATING RIBS

(76) Inventor: Boyd I. Willat, 9120 Oriole Way, Los Angeles, CA (US) 90069

( * ) Notice: Subject to any disclaimer, the term of this patent is extended or adjusted under 35 U.S.C. 154(b) by 0 days.

(21) Appl. No.: 09/846,140

(22) Filed: Apr. 30, 2001

(51) Int. Cl.[7] .................................................. A47J 43/27
(52) U.S. Cl. ........................ 366/130; 366/143; 206/520; 220/662
(58) Field of Search .................. 366/130, 143, 366/219, 307; 220/568, 662; 215/DIG. 8; 206/217, 219, 515, 519, 520; 229/400, 404, 915; D7/531, 532

(56) References Cited

U.S. PATENT DOCUMENTS

| | | | | |
|---|---|---|---|---|
| 1,661,336 | A | * | 3/1928 | Katz |
| 2,021,495 | A | * | 11/1935 | Anderson |
| 2,036,407 | A | * | 4/1936 | Godfrey |
| D120,226 | S | * | 4/1940 | Lundy |
| 2,208,431 | A | * | 7/1940 | Rochow |
| 2,352,205 | A | * | 6/1944 | Karlson |
| 2,592,485 | A | * | 4/1952 | Stair |
| 2,962,201 | A | * | 11/1960 | Brillis et al. |
| 2,965,274 | A | * | 12/1960 | Brillis et al. |
| 2,988,258 | A | | 6/1961 | Witzke |
| 3,074,263 | A | * | 1/1963 | Farmer |
| 3,397,867 | A | | 8/1968 | Hoff |
| 3,405,858 | A | | 10/1968 | Collie |
| 3,434,626 | A | | 3/1969 | Kinslow, Jr. |
| 3,441,173 | A | | 4/1969 | Edwards |
| 3,443,715 | A | | 5/1969 | Edwards |
| 3,464,587 | A | | 9/1969 | Edwards |
| 3,471,055 | A | | 10/1969 | Edwards |
| 3,677,524 | A | * | 7/1972 | Douglas |
| 3,727,783 | A | | 4/1973 | Carmichael |
| 3,730,385 | A | | 5/1973 | Rost |
| 3,759,410 | A | | 9/1973 | Uhlig |
| 3,784,052 | A | | 1/1974 | Edwards |
| 3,820,692 | A | * | 6/1974 | Swett et al. |
| 3,838,772 | A | | 10/1974 | Lang et al. |
| 3,934,725 | A | | 1/1976 | Edwards |
| 3,995,740 | A | | 12/1976 | Amberg et al. |
| 4,003,555 | A | * | 1/1977 | Swartz |
| 4,044,889 | A | * | 8/1977 | Orentreich et al. |
| 4,054,219 | A | | 10/1977 | Young et al. |
| 4,082,184 | A | * | 4/1978 | Hammer |
| 4,156,483 | A | | 5/1979 | Day |
| 4,197,948 | A | | 4/1980 | Amberg et al. |
| 4,249,666 | A | | 2/1981 | Hubert et al. |
| 4,577,775 | A | | 3/1986 | Kresin |

(List continued on next page.)

FOREIGN PATENT DOCUMENTS

GB           327661    *    4/1930

*Primary Examiner*—Charles E. Cooley
(74) *Attorney, Agent, or Firm*—Karin Peterka of Buchalter, Nemer, Fields & Younger

(57) ABSTRACT

The present invention is directed to a stackable, recyclable, plastic beverage tasting vessel, preferably used for tasting wine. The vessel comprises a bottom portion and a side wall extending upwardly and outwardly from the bottom portion and terminating in an open top having an outwardly extending rim. The rim comprises a curved portion with a plurality of radially extending ridges for aerating the beverage, an angled edge portion for directing the beverage to the top of a taster's tongue, and a curved pouting lip portion for directing the beverage to the sides and under a taster's tongue. The vessel further comprises a raised portion or dome formed in the bottom of the vessel and projecting upwardly into the interior of the vessel, and a platform portion formed on a portion of the raised portion. The vessel further comprises at least one radially projecting rib integral with the interior surface of the side wall and positioned opposite the platform portion. The platform portion and the rib are designed to maximize the mixing of the beverage inside the vessel. The vessel may also comprise a magnifier panel, textured panel, lid, and other features.

20 Claims, 7 Drawing Sheets

U.S. PATENT DOCUMENTS

| | | |
|---|---|---|
| 4,609,113 A | 9/1986 | Seki |
| 4,610,351 A | 9/1986 | Coles et al. |
| D300,706 S | 4/1989 | Durand |
| 4,818,114 A * | 4/1989 | Ghavi |
| 4,832,212 A | 5/1989 | Askinazi |
| 4,978,015 A | 12/1990 | Walker |
| 4,993,566 A | 2/1991 | Eberle |
| 5,503,283 A | 4/1996 | Semersky |
| 5,507,402 A | 4/1996 | Clark |
| 5,547,275 A * | 8/1996 | Lillelund et al. |
| D381,558 S | 7/1997 | Schaefer et al. |
| 5,785,197 A | 7/1998 | Slat |
| 5,788,369 A * | 8/1998 | Tseng |
| 5,913,964 A | 6/1999 | Melton |
| 6,095,033 A | 8/2000 | Melton |
| 6,138,862 A * | 10/2000 | Tai |

* cited by examiner

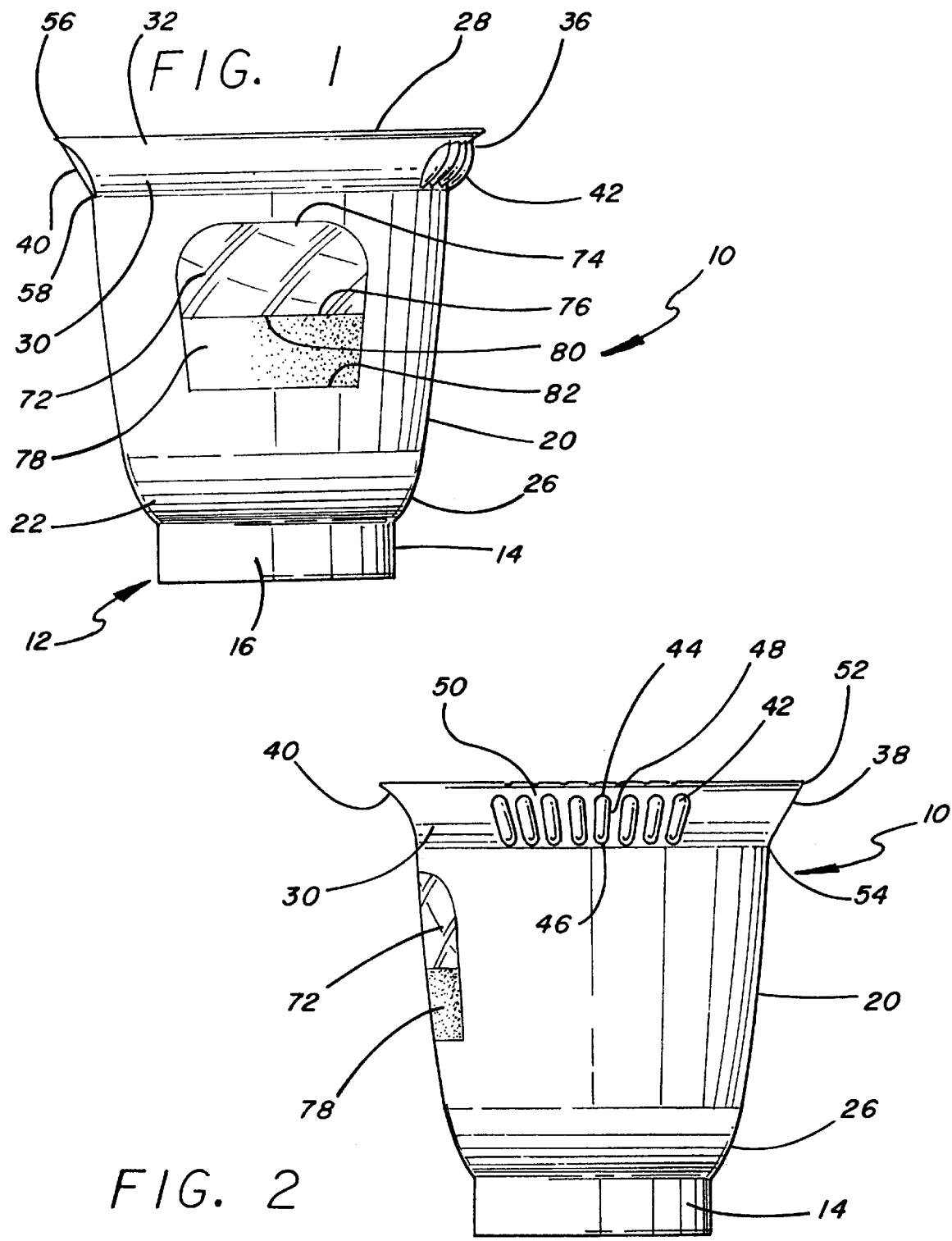

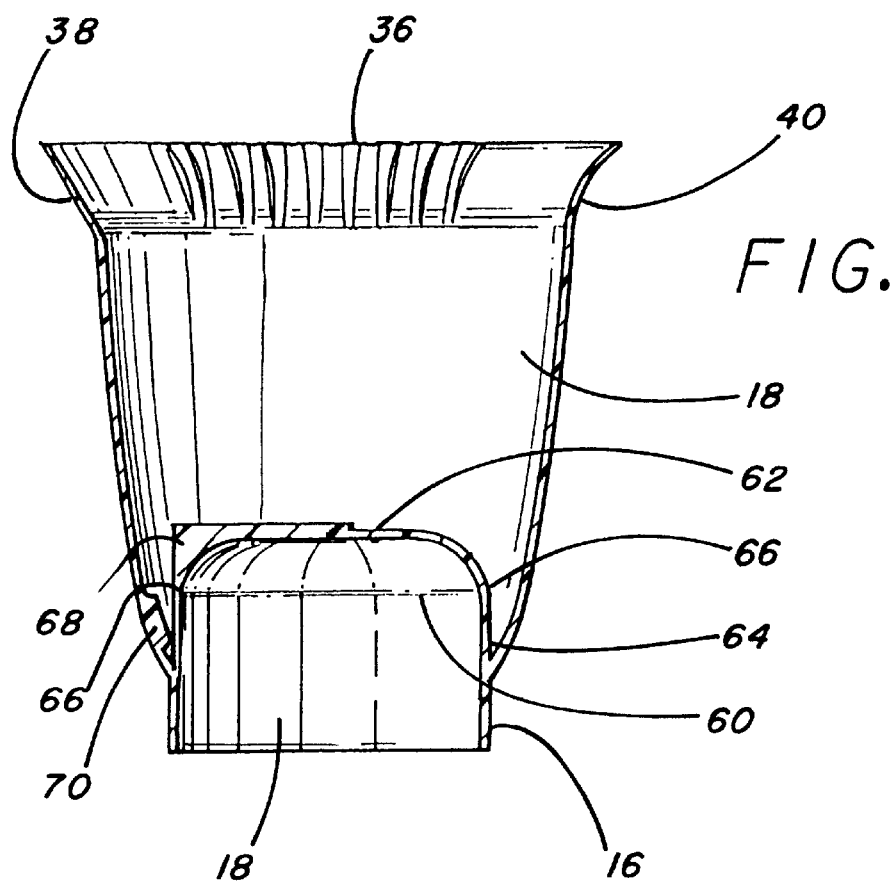
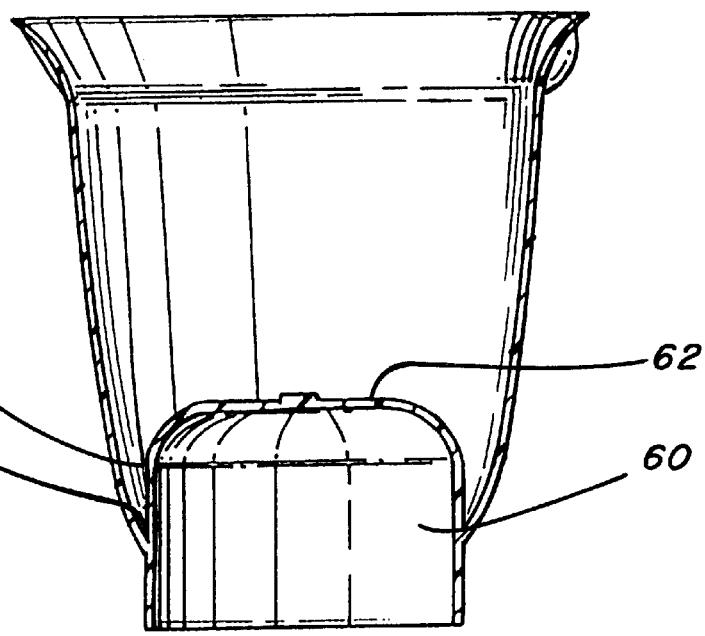

BEVERAGE TASTING VESSEL WITH AERATING RIDGES AND AGITATING RIBS

BACKGROUND OF THE INVENTION

The present invention relates to a beverage tasting vessel. More particularly, the present invention relates to a stackable, stemless, omnivarietal, recyclable, disposable plastic beverage vessel designed for tasting and examining wine, coffee, tea, and other beverages. The vessel of the present invention through a unique design, combines into one device all the sense enhancing features necessary for tasting and examining all varieties of wines and other beverages. The vessel comprises a uniquely designed rim for tasting and aerating the beverage in the vessel, a uniquely designed raised hollow dome portion for holding, viewing, and portion measuring the beverage contained in the vessel, and a uniquely designed bottom platform portion and rib system inside the bottom of the vessel to facilitate mixing the beverage sufficiently to enable the bouquet or smell of the beverage to be released while in the vessel.

In the art of wine tasting, prior to tasting the wine, it is desirable to swirl a small amount of wine, typically less than one ounce, in a vessel to circulate the esters and release the bouquet or fragrance of the wine. In general, acidic and tannic wines, such as white wines and light colored wines, are best tasted when poured onto the top, and preferably the top center, of a taster's tongue, whereas fruity and sweet wines, such as red wines and dark colored wines, are best tasted when poured to the sides and under a taster's tongue. In the art of wine tasting, it is also desirable to make the vessel of a clear material, such as glass or plastic, in order to view the color, consistency, age, strength, glycerin content, surface tension, and other features of the wine. It is also desirable to make the vessel of a material that does not affect the scent of the wine and that does not become discolored by the wine.

Known wine tasting vessels are typically made of glass since glass imparts little or no odor to the wine. However, compared to plastic, glass is more expensive to manufacture, is a heavier material and thus bulkier and more costly to transport and ship, is more prone to breakage, and is more difficult to stack for packaging and storage.

Plastic beverage vessels are known but such known beverage vessels are deficient compared to the present invention. A known beverage vessel is disclosed in U.S. Pat. No. 3,934,725 to Edwards. This patent discloses a stackable plastic vessel having in one version ribs that form a fluted configuration circumferentially at the top of the vessel. However, the ribs are formed about the circumference of the container and are designed to facilitate the stacking of the vessel and are not designed for aerating the beverage in the vessel. Providing ribs about the entire circumference of the vessel increases the complexity of the vessel and increases the costs of manufacturing the vessel. Moreover, such ribs are positioned below the rim of the vessel rather than integrated into the rim of the vessel, and there is no dome portion or platform portion inside the bottom of the vessel.

Another known plastic beverage vessel is disclosed in U.S. Pat. No. 3,784,052 to Edwards. This patent discloses a stackable plastic vessel having in one version a cylindrical stacking means portion projecting upwardly inside the bottom of the vessel. However, the stacking means has an open top and is not designed to mix and measure the beverage in the vessel. In addition, the vessel of this patent does not have a rim uniquely designed for aerating and tasting the beverage in the vessel.

Thus, these known vessels, as well as other known vessels, do not address or solve the problem of providing a beverage vessel having the following unique features: a uniquely designed rim which includes one or more portions for aerating a beverage to maximize the tasting of the beverage, for directing a beverage to the top of a taster's tongue, and for directing a beverage to the sides and under a taster's tongue; a uniquely designed raised dome portion in the bottom of the vessel for measuring the desired amount of beverage in the vessel for tasting; a uniquely designed platform portion on the raised portion and a uniquely designed rib across from the platform portion, which together, maximize the mixing of the beverage in the vessel; a magnifier panel on the vessel for maximizing the viewing of various characteristics of the beverage prior to and during tasting; a textured panel for identifying the beverage and characteristics of the beverage; and various other unique features.

Accordingly, there is a need for a new and improved beverage tasting vessel which overcomes and avoids the problems associated with known vessels.

SUMMARY OF THE INVENTION

The present invention satisfies all of these needs as well as provides a unique and nonobvious beverage tasting vessel. None of the known vessels provides all of the numerous advantages of the present invention.

It is an aspect of the present invention to provide a stackable beverage tasting vessel, preferably made of plastic, that can be used for tasting wines, coffees, teas, and other beverages.

It is a further aspect of the present invention to provide a beverage tasting vessel that is preferably made of a clear plastic material that is recyclable, that does not impart odor to the beverage, that minimizes or eliminates beverage discoloration of the vessel, that is dishwasher safe, and that is of a sufficient resiliency so as to prevent damage to the vessel in transport, storage, and use.

It is a further aspect of the present invention to provide a beverage tasting vessel that is economical and easy to manufacture and that is both reusable and disposable.

It is a further aspect of the present invention to provide a beverage tasting vessel that has a uniquely designed rim which includes a plurality of ridges formed on a curved portion of the rim, wherein upon tasting of the beverage in the vessel, the ridges maximize the taste by aerating the beverage when an individual taster sucks in air along with the beverage.

It is a further aspect of the present invention to provide a beverage tasting vessel that has a uniquely designed rim which includes an angled edge portion formed on a straight portion of the rim, wherein upon tasting of the beverage in the vessel, the angled edge portion directs the beverage to the top of a taster's tongue. Preferably, this feature is used to maximize the tasting of tannic and acidic wines, such as white wines and light colored wines.

It is a further aspect of the present invention to provide a beverage tasting vessel that has a uniquely designed rim which includes a curved pouting lip portion formed on a curved portion of the rim, wherein upon tasting of the beverage in the vessel, the curved pouting lip portion directs the beverage to the sides and under a taster's tongue. Preferably, this feature is used to maximize the tasting of fruity and sweet wines, such as red wines and dark colored wines.

It is a further aspect of the present invention to provide a beverage tasting vessel that has a uniquely designed raised portion inside the bottom of the vessel, preferably in the form of a dome or punt, for measuring the desired amount of beverage in the vessel for tasting.

It is a further aspect of the present invention to provide a beverage tasting vessel that has a uniquely designed platform portion on the raised portion and one or more uniquely designed ribs or fins across from the platform portion and attached to the interior wall of the glass. The ribs or fins, individually or together with the platform, maximize the stirring or mixing of the beverage in the vessel, and cause the bouquet or smell of the beverage to be opened while in the vessel.

It is a further aspect of the present invention to provide a beverage tasting vessel that includes a collar stem at the base of the vessel for convenient and easy handling of the vessel. The collar stem allows an individual to hold the vessel by pinching the collar stem ring or base, thus preventing or minimizing the placement of the individual's fingers or fingerprints on the body of the vessel to allow an unobstructed and clear view of the contents in the vessel.

It is a further aspect of the present invention to provide a beverage tasting vessel that includes a magnifier panel on a side portion of the vessel for maximizing the viewing and examination of various characteristics of the beverage inside the vessel.

It is a further aspect of the present invention to provide a beverage tasting vessel that may include a textured area on an exterior side portion of the vessel. The textured portion is designed for writing thereon with a writing instrument, such as a pencil or pen.

It is a further aspect of the present invention to provide a beverage tasting vessel that may include a lid with or without a label.

The present invention is directed to a unitary vessel comprising a bottom portion, preferably a collar stem, and a side wall extending upwardly and outwardly from the bottom portion. The side wall terminates in an open top having an outwardly extending rim. The rim comprises: (a) a curved portion with a plurality of radially extending ridges, (b) an angled edge portion, and (c) a curved pouting lip portion. The rim is designed for aerating and maximizing the tasting of a beverage in the vessel. Preferably, the radially extending ridges are of a size and shape to sufficiently aerate the beverage when it is tasted. Preferably, the angled edge portion is of a size and shape to direct the beverage, when tasted, to a top portion of a taster's tongue. Preferably, the curved pouting lip portion is of a size and shape to direct the beverage, when tasted, to the sides and under a taster's tongue.

The vessel further comprises a raised portion formed in the bottom of the vessel and projecting upwardly into the interior of the vessel, and a platform portion formed on a portion of the raised portion. The vessel further comprises at least one radially projecting rib integral with the interior surface of the side wall and positioned opposite the platform portion. The raised portion is designed to measure a desired amount of beverage to be tasted. The platform portion and the rib are designed to maximize the mixing of a liquid or beverage inside the vessel.

Preferably, the vessel is made of a plastic material, is stackable, and is adapted for use by an individual in tasting and consuming beverages, such as wine, coffee, and tea. The vessel may further comprise a magnifier panel on a portion of the side wall, the magnifier panel being designed to magnify characteristics of the beverage poured into the vessel. The vessel may further comprise a textured panel on a portion of the side wall, the textured panel being designed for writing thereon with a writing instrument. The vessel may further comprise a lid which is adapted to fit around the exterior of the rim.

BRIEF DESCRIPTION OF THE DRAWINGS

FIG. 1 is a front view of the beverage tasting vessel of the present invention;

FIG. 2 is a right side view of the vessel of FIG. 1;

FIG. 9 is a cross-sectional view of the vessel of FIG. 5, taken along lines 9—9 of FIG. 5;

FIG. 10 is a cross-sectional view of the vessel of FIG. 6, taken along lines 10—10 of FIG. 6; and, FIG. 11 is cross-sectional view of a pair of vessels such as shown in FIG. 1 to show the stacking arrangement of such vessels.

DETAILED DESCRIPTION

The present invention is directed to a beverage tasting vessel designed for use by an individual for tasting, examining, and consuming beverages, such as wine, coffee, tea, and other beverages. The vessel is of a size and shape for aligning the vessel in a nested and stacked position with a plurality of identical or similar vessels. The vessel is preferably made of a clear plastic material that is recyclable, dishwasher safe, reusable, and sturdy. More preferably, the vessel is comprised of a rigid, sturdy plastic material, such as polycarbonate, polystyrene, or macralon having a substantially uniform thickness. The preferred plastic material used with the present invention provides such advantages as lower manufacturing costs and simple fabrication. In addition, the preferred plastic material minimizes or prevents any odor of the plastic from being imparted to the beverage in the vessel, minimizes or prevents the discoloration or staining of the vessel by the beverage in the vessel, and minimizes or prevents the breaking down or disintegrating of the plastic material by the beverage in the vessel. However, it is contemplated that the vessel may be made of other suitable materials, such as other suitable plastics or glass.

The vessel of the present invention is preferably made by blow molding or injection molding. The vessel of the present invention preferably has a volume capacity of from about 2 ounces to about 16 ounces. More preferably, one version of the vessel has a volume capacity of 4 ounces, and another version of the vessel has a volume capacity of 8 ounces. However, the vessel may also be of other suitable sizes.

Figure 3:
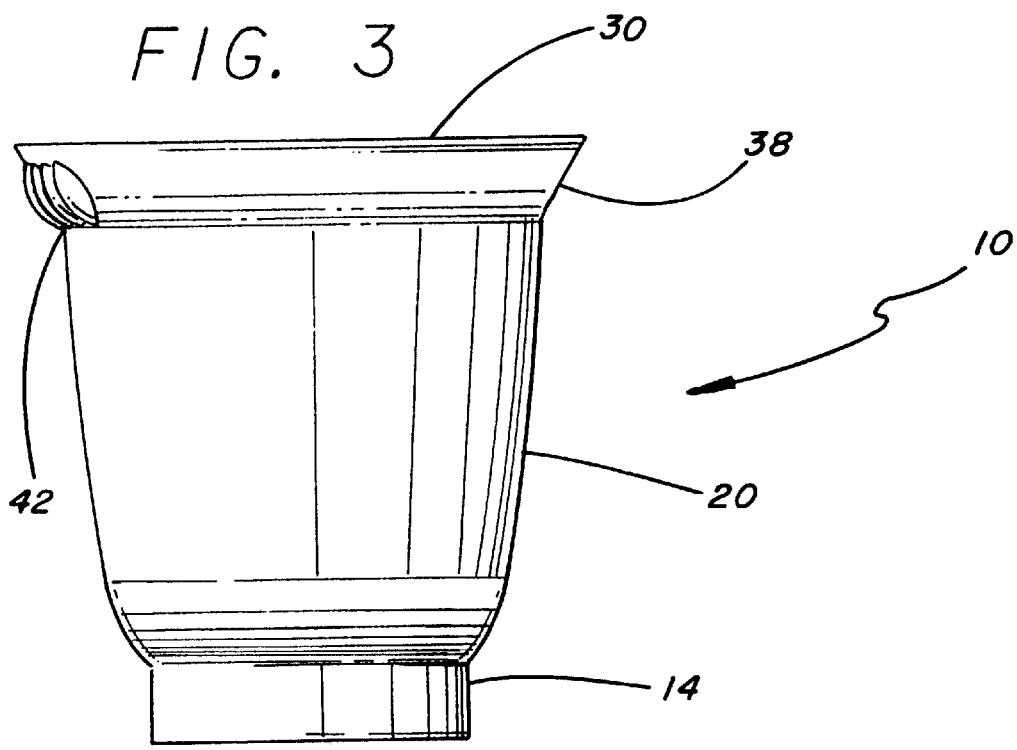
FIG. 3 is a back view of the vessel of FIG. 1.
Figure 4:
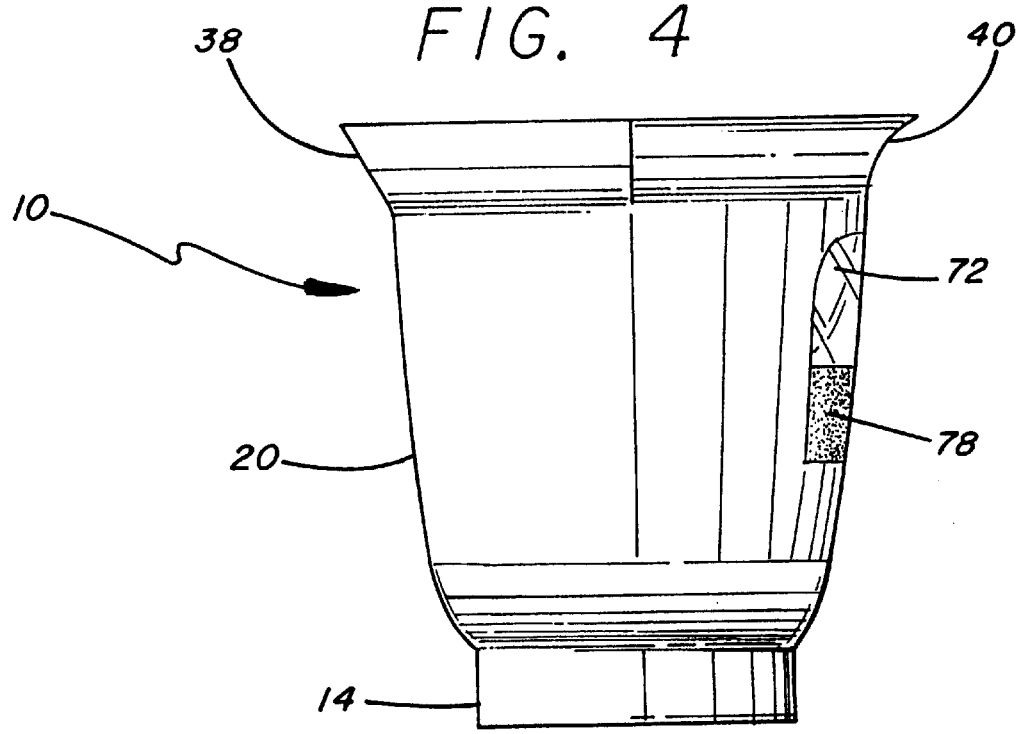
FIG. 4 is a left side view of the vessel of FIG. 1.
Figure 5:
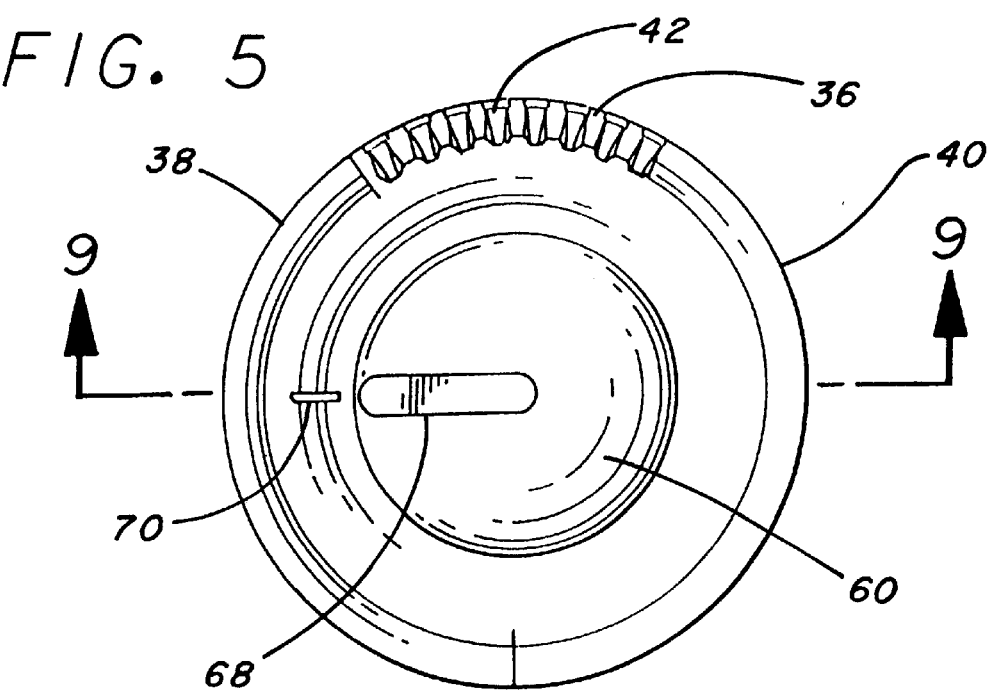
FIG. 5 is a top view of the vessel of FIG. 1.
Figure 6:
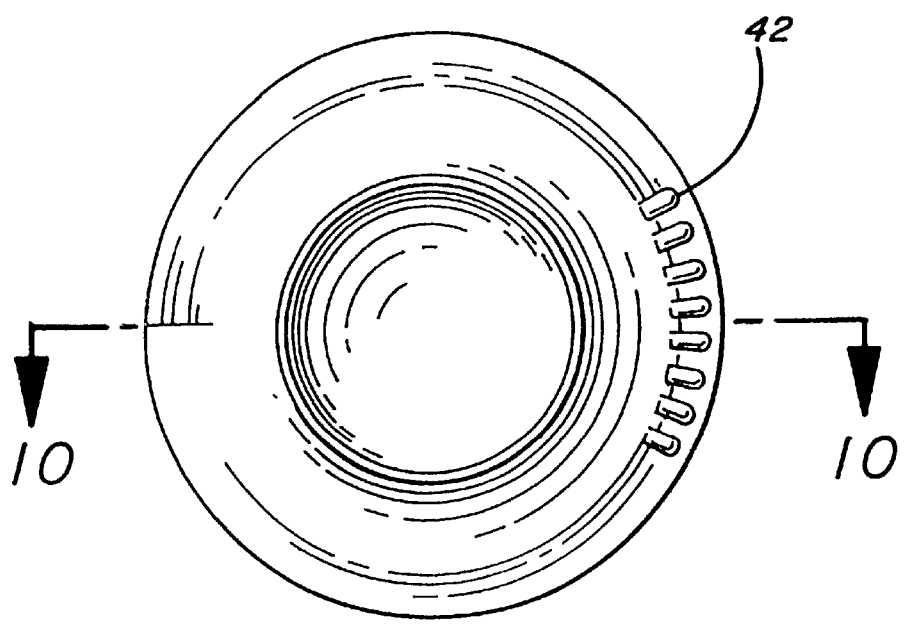
FIG. 6 is a bottom view of the vessel of FIG. 1.
Figure 7:
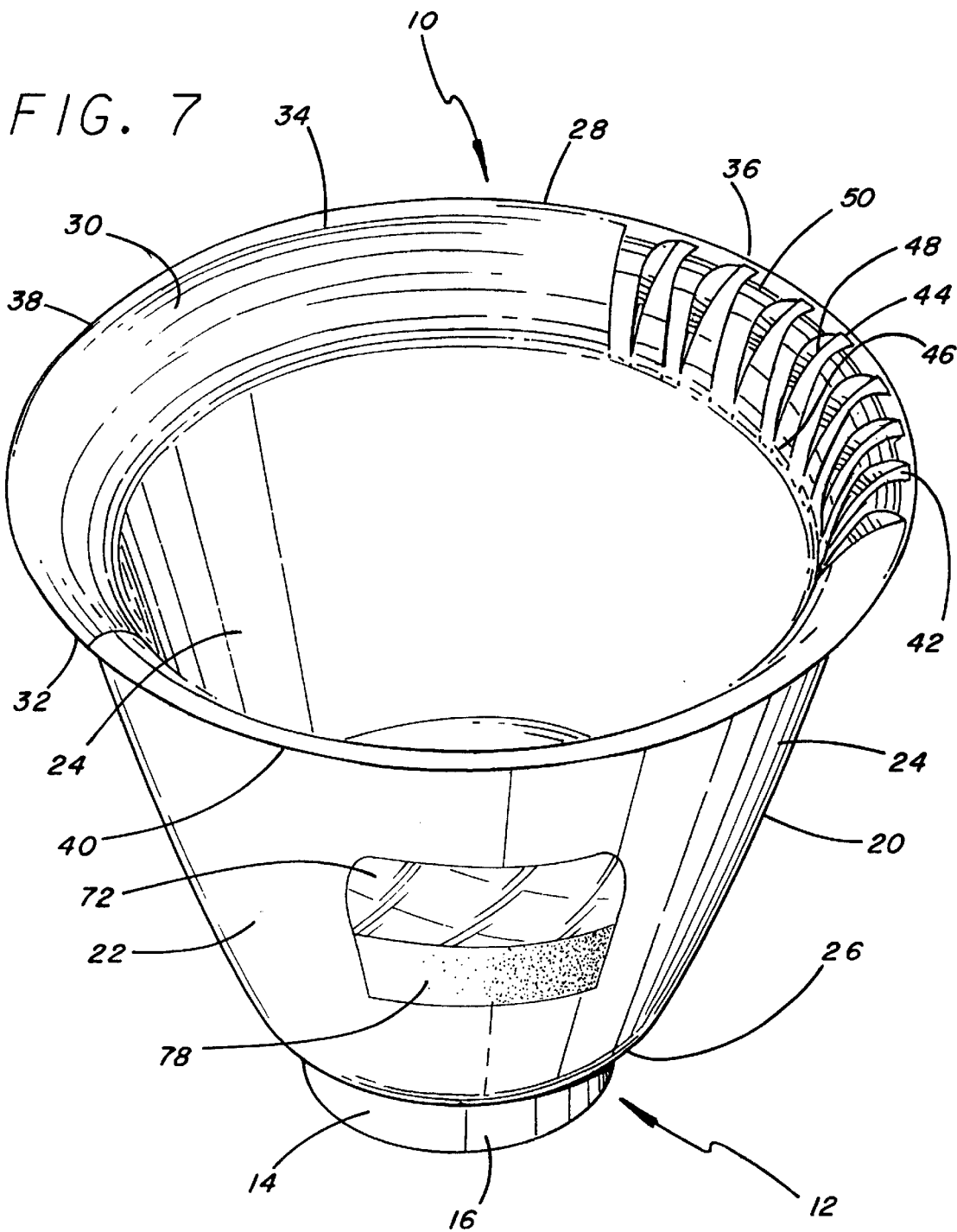
FIG. 7 is a perspective view of the vessel of FIG. 1.

FIG. 1 is front view of the beverage tasting vessel of the present invention. FIG. 2 is a right side view of the vessel of FIG. 1. FIG. 3 is a back view of the vessel of FIG. 1. FIG. 4 is a left side view of the vessel of FIG. 1. FIG. 5 is a top view of the vessel of FIG. 1. FIG. 6 is a bottom view of the vessel of FIG. 1. FIG. 7 is a perspective view of the vessel of FIG. 1.

As shown in FIGS. 1–4 and 7, the vessel 10 comprises a bottom portion 12 preferably in the form of a hollow collar stem 14 designed for easy handling and grasping by an individual holding the vessel at the bottom. The collar stem allows an individual to hold the vessel by pinching the collar stem ring (pinch ring) or base (see FIGS. 9–10 to see cross-sectional view) such as pinching between the individual's thumb and forefinger, thus preventing or minimizing the placement of the individual's fingers or fingerprints on the body of the vessel. By holding the vessel in this way, this allows an unobstructed and clear viewing and examination of the contents in the vessel to be achieved. The collar stem 14 has an exterior surface 16 and an interior surface 18 (see FIG. 9). The thickness of the collar stem 14 is preferably from about 1/32 inch to about 1/16 inch. The outer diameter of the collar stem 14 is preferably from about 1.5 inches to about 2.0 inches. Although the collar stem 14 is preferred, the bottom of the cup may also be flat.

The vessel 10 further comprises a side wall 20 that extends upwardly and outwardly from the bottom 12. As shown in FIG. 7, the side wall 20 has an exterior surface 22 and an interior surface 24. Preferably, the side wall 20 has a bottom curved portion 26 that curves outwardly from the collar stem 14. The side wall 20 terminates in an open top 28 having an outwardly extending rim 30. The side wall 20 is designed to allow a swirling action of the beverage to occur inside the vessel. Preferably, the height of the side wall from the bottom curved portion 26 to the open top 28 is from about 2.5 inches to about 4.0 inches. As shown in FIG. 7, the rim 30 has an exterior surface 32 and an interior surface 34. The outer diameter of the rim 30 is preferably from about 2.0 inches to about 4.0 inches. As particularly shown in FIG. 9, the rim 30 is divided into three portions comprising a curved, ridged portion 36, an angled edge portion 38, and a curved pouting lip portion 40.

The curved, ridged portion 36 is positioned along the rim 30 between the angled edge portion 38 and the pouting lip portion 40. As shown in the FIGS., the curved, ridged portion 36 comprises a plurality of radially extending aerating ridges 42. The aerating ridges 42 are of a unique size and shape to sufficiently aerate the beverage when the beverage is tasted or sipped by an individual. Preferably, the total number of aerating ridges 42 is from three to twelve. More preferably, the number of aerating ridges 42 is eight. As shown in FIG. 7, each aerating ridge 42 has a top end 44, a bottom end 46, and sides 48. Preferably, the shape of the ridges 42 is substantially triangular or sectional. However, other suitable shapes may also be contemplated. The ridges 42 preferably project inwardly from the curved rim portion of the vessel. Preferably, the length of each ridge 42 from the bottom end 46 to the top end 44 is from about 3/8 inch to about 1/2 inch. Preferably, the width of each ridge 42 decreases gradually from the bottom end 46 to the top end 44. However, the width of each ridge 42 may also be uniform across the length of the ridge. Preferably, the thickness of each ridge 42 is from about 3/32 inch to about 1/8 inch. In between the ridges 42 are spaces 50 which act as channels or canals for the beverage to travel to a taster's mouth when the beverage or liquid is tasted or sipped by an individual. Preferably, the width of each space 50 between aerating ridges 42 is from about 3/32 inch wide to about 1/8 inch wide. The aerating ridges 42 and spaces 50 are shaped and spaced in such as way as to maximize the aeration of the beverage when it is tasted or sipped. Aeration occurs when air and oxygen are ingested along with the beverage upon tasting. Aerating a beverage such as wine results in the wine mixing with oxygen and releasing more of its taste, as well as causing the liquid to spray across the entire tongue and pallet of the mouth, engaging more of the taste buds of the tongue at one moment.

As shown in FIGS. 2 and 9, the rim 30 further comprises an angled edge portion 38. This angled edge portion 38 is substantially straight and has a top portion 52 and a bottom portion 54. Preferably, the thickness of the angled edge portion 38 is from about 3/8 inch to about 5/8 inch. The angle formed between the exterior side wall 22 and the angled edge portion 38 of the rim preferably measures from about 135 degrees to about 160 degrees. The angled edge portion 38 is positioned along the rim 30 between the ridged portion 36 and the pouting lip portion 40. Preferably, the angled edge portion 38 is formed along about one-third the circumference of the vessel rim 30. However, the amount of circumference of the angled edge portion 38 can vary depending on the beverage being tasted. The angled edge portion 38 is designed to direct the beverage, when it is tasted or sipped, to the top of the taster's tongue, and preferably to the top center of the taster's tongue. This is especially advantageous when drinking acidic and tannic wines, such as white wines and lighter colored wines, as the taste of acidic and tannic wines are maximized when poured onto the top of a taster's tongue, and preferably the top center of a taster's tongue. This allows the characteristic tastes of tannic and acidic, even bitter or dry wines, to engage the taster's tongue first and particularly engage the top of the taster's tongue before the wine is ingested or swallowed.

As shown in FIGS. 2 and 9, the rim 30 further comprises a curved pouting lip portion 40. The pouting lip portion 40 is positioned along the rim 30 between the angled edge portion 38 and the curved, ridged portion 36. This pouting lip portion 40 is substantially curved outwardly from the rim and includes a top portion 56 and a bottom portion 58. The pouting lip portion 40 is preferably in the shape of a pouting lower lip on a person or substantially in the shape of the circumference of a pie-shaped piece or portion. Preferably, the thickness of the pouting lip portion 40 is from about 1/4 inch to about 1/2 inch. Preferably, the pouting lip portion 40 is formed along about one-third the circumference of the vessel rim 30. However, this amount of circumference of the pouting lip portion 40 can vary depending on the beverage being tasted. The pouting lip portion 40 is designed to direct the beverage, when it is tasted or sipped, to the sides and under a taster's tongue. This is especially advantageous when drinking fruity and sweet wines, such as red wines and darker colored wines, because the taste of fruity and sweet wines are maximized when poured onto the sides of and under a taster's tongue. The taste buds on the sides of and under the taster's tongue that respond to sweetness and complex fruity flavors will engage the wine first and the initial taste and impression will enhance the tasting experience.

In the preferred embodiment of the present invention, it is contemplated that the curved, ridged portion 36, the angled edge portion 38, and the pouting lip portion 40 are formed on separate one-third portions of the rim of the vessel. However, in other embodiments of the present invention, the vessel may include one or more combinations of these rim portions 36, 38, 40.

As shown in FIGS. 9 and 10, the vessel 10 further comprises a raised portion 60 formed in the bottom 12 of the vessel and projecting upwardly into the interior of the vessel. FIG. 9 is a cross-sectional view of the vessel of FIG. 5, taken along lines 9—9 of FIG. 5. FIG. 10 is a cross-sectional view of the vessel of FIG. 6, taken along lines 10—10 of FIG. 6. Preferably, the raised portion 60 is substantially in the shape of a dome or punt. The raised portion 60 may also be of other suitable shapes such as substantially rectangular. The raised portion 60 has a top end 62, a bottom end 64, and sides 66. The bottom end 64 is integral with the interior surface 24 of the side wall 20. The top end 62 of the raised dome portion 60 is preferably spaced from the side wall 20 a distance of about ⅛ inch to about ⅜ inch. Preferably, the height of the raised portion 60 from the bottom end 64 to the top end 62 is from about 0.5 inch to about 1.0 inch. Preferably, the width of the raised portion 60 is from about 1.25 inches to about 1.75 inches. Preferably, the thickness of the raised portion 60 is from about 1/32 inch to about 3/16 inch.

The raised portion 60 is preferably designed to measure a predetermined or selected amount of the beverage to be tasted or consumed and allows an individual to control the portion tasted. The predetermined volume of the beverage to be tasted can be measured from the top end 62 of the raised portion 60 in the vessel. In one version of the present invention, the raised portion 60 may be of a height such that when the beverage is poured to the top end 62 of the raised portion 60, the desired amount of beverage for tasting in the vessel is ⅔ ounce in volume. In another version of the present invention, the raised portion 60 may be of a height such that when the beverage is poured to the top end 62 of the raised portion 60, the desired amount of beverage for tasting in the vessel is 1⅓ ounces in volume. The raised portion 60 in the vessel of the present invention also allows an individual to better view the color and pigmentation of wine when wine is inside the vessel. A meniscus, or clearer, thin portion, that forms at the top of the wine after it is poured can also be seen when the wine is viewed through the side wall of the vessel. The meniscus of the wine gives an indication of various characteristics of the wine, such as the age, strength, color, amount of glycerin, and consistency of the wine.

The vessel 10 further comprises a platform portion 68 (see FIG. 9) formed on an area of the top and side of the raised portion 60. The platform portion 68 is substantially flat and slightly raised on top and extends from about the center of the raised portion 60 to the side 66 of the raised portion and down side 66. Preferably, the platform portion 68 forms a 90 degree angle with side 66 of the raised portion 60. Other than the angled, platform portion 68, the top and side of the raised portion 60 is substantially curved. The platform portion 68 is of a suitable size and shape to enable the printing of words, a name, a design, or a logo on the platform.

As shown in FIGS. 5 and 9, the vessel 10 further comprises at least one rib or fin 70, and if desired, a plurality of ribs or fins 70, that projects radially inwardly from the bottom interior surface 24 of the side wall 20 into the interior of the vessel 10. The rib 70 is spaced opposite the side of the platform 68 at a distance of from about ⅛ inch to about ½ inch. Preferably, the length of the rib 70 is from about ¾ inch to about 1.0 inch. Preferably, the width of the rib 70 is from about 1/16 inch to about ⅛ inch. Preferably, the thickness of the rib 70 is from about 1/16 inch to about ⅛ inch.

The platform portion 68, in conjunction with the rib 70, is designed to maximize the swirling, mixing or agitating of the beverage inside the vessel. For example, when wine is swirled, mixed or agitated, the bouquet or fragrance of the wine is released for an individual to smell prior to tasting. The swirling of the beverage causes a slight venturi effect by compressing the beverage and causing subsequent expansion of the beverage after the beverage passes from the side wall to the platform portion. In addition, the platform portion 68 in conjunction with the rib 70 is designed to minimize or eliminate the formation of bubbles when a beverage such as wine is mixed or agitated in the vessel prior to tasting.

As shown in FIG. 1, the vessel 10 may further include a magnifier panel 72 on a portion of the side wall 20. The magnifier panel 72 has a top end 74 and a bottom end 76. The magnifier panel 72 is of a desired size, shape, and magnification to maximize the viewing of the beverage or liquid inside the vessel 10. The magnifier panel 72 is preferably shaped as shown in FIG. 1. However, the magnifier panel 72 may also be substantially oval in shape, round in shape, rectangular in shape, or another suitable shape and size. Preferably, the magnifier panel 72 is designed to magnify features or characteristics of the beverage inside the vessel 10, and preferably, the magnifier panel 72 has a magnification in the range of from about one to eight times the original size of the object being viewed. Preferably, the bottom end 76 of the magnifier panel 72 is spaced from the bottom of the collar stem 14 of the vessel a distance of from about 1.25 inches to about 3.0 inches. Preferably, the top end 74 of the magnifier panel 72 is spaced from the top of the rim 30 a distance of from about 1.0 inch to about 1.25 inches. The magnifier panel 72 is comprised of the same material comprising the vessel. The magnifier panel 72 preferably has a frenell pattern on its exterior surface of the same material comprising the vessel. When wine is poured into the vessel, the magnifier panel 72 advantageously allows an individual to view various characteristics of the wine such as the pigment, age, surface tension, color, glycerin content, how it folds together, the meniscus, and other characteristics.

The vessel may further include a textured or rough panel 78 on a portion of the side wall 20. As shown in the FIGS., preferably the textured panel 78 is positioned below and adjacent to the bottom end 76 of the magnifier panel 72. The textured panel 78 is of a desired size, shape, and texture designed for writing thereon with a writing instrument, such as a pencil or pen. The textured panel 78 has a top end 80 and a bottom end 82. The textured panel 78 is preferably shaped as shown in FIG. 1. However, the textured panel 78 may also be substantially oval in shape, round in shape, square in shape, or another suitable shape and size. Preferably, the bottom end 82 of the textured panel 78 is spaced from the bottom of the collar stem 14 a distance of from about 1.0 inch to about 2.0 inches. Preferably, the top end 80 of the textured panel 78 is spaced from the top of the rim 30 a distance of from about 1.0 inch to about 2.0 inches. The textured panel 78 is preferably comprised of the same material as the vessel. Preferably, the textured panel 78 has a surface texture similar to about a 600 grit sandpaper surface. However, other suitable surface textures may also be used. The textured panel 78 is designed to allow an individual to easily write on the textured panel 78 with a writing instrument, such as a pen or pencil, and without interfering with or obscuring the viewing of the beverage or liquid inside the vessel.

Figure 8:
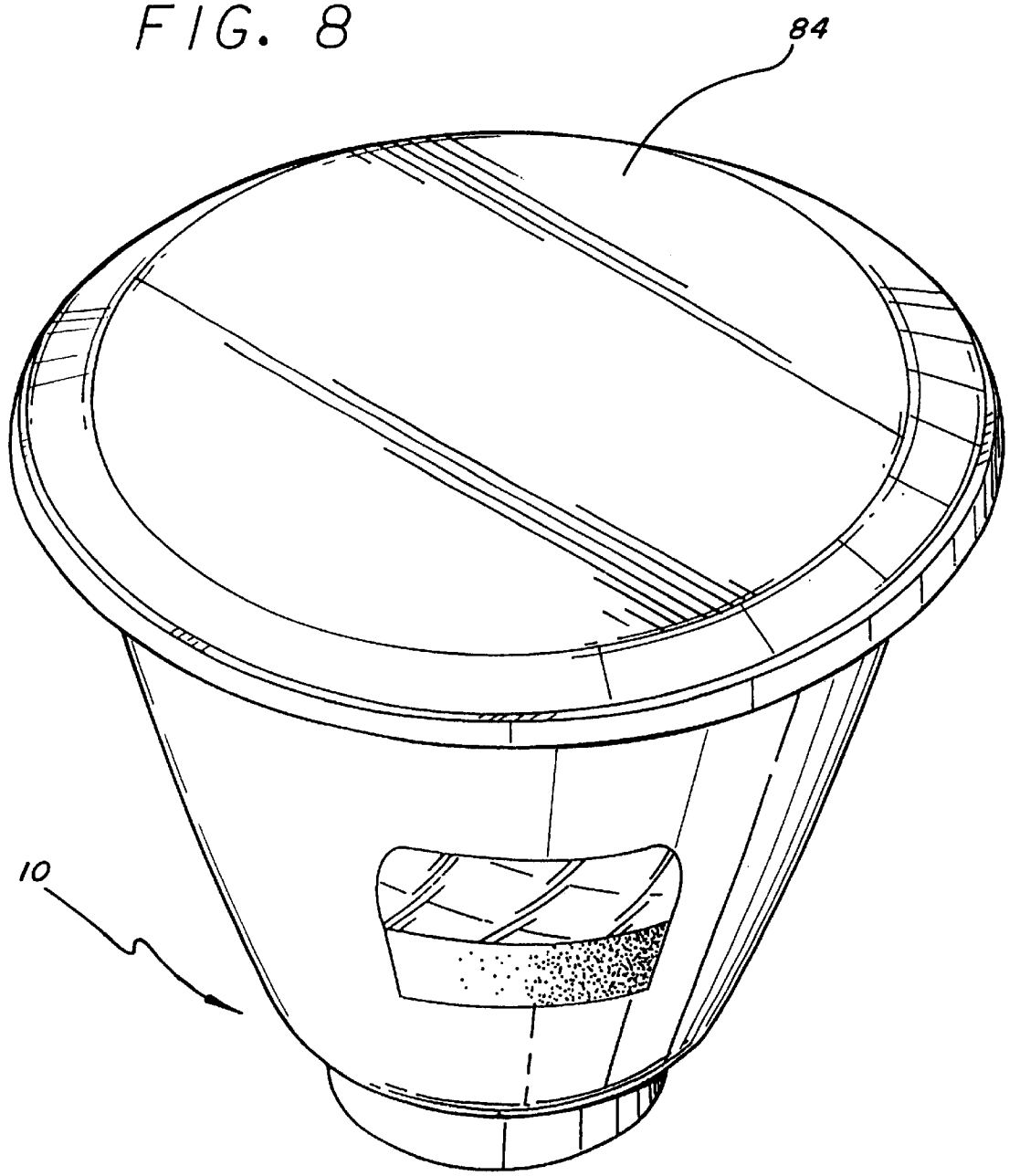
FIG. 8 is a perspective view of the vessel of FIG. 1 showing another version of the vessel with a lid.

As shown in FIG. 8, a perspective view of another version of the vessel 10 of the present invention includes a top lid 84. Preferably, the lid 84 is adapted to fit around the exterior of the rim 30. The lid 84 may have an identifying label on its top surface that is attached to the lid 84 by an adhesive material. One version of the lid 84 may comprise a snap-on type lid preferably made of a plastic material such as macralon. However, the snap-on type lid may also be comprised of other suitable plastics, metals, paper, cardboard, or other suitable materials. Another version of the lid 84 may comprise an aluminum covering piece, alone or covered with an attached label or paper. An oversized aluminum piece may have rigid edges that can fold over the rim 30 of the vessel or that seal around the rim 30 of the vessel to secure the lid 84 over the vessel.

The vessel may further include embossed areas (not shown) on one or more portions of the side wall of the vessel that comprise embossed characters, such as letters or words, for identifying the beverage or liquid that is to be tasted and examined inside the vessel. For example, when the vessel is used for tasting wine, the embossed areas may be positioned underneath the various rim portions 36, 38, and 40, so as to identify what portion of the rim 36, 38, 40 is to be used for tasting a various colored wine or type of wine.

Figure 11:
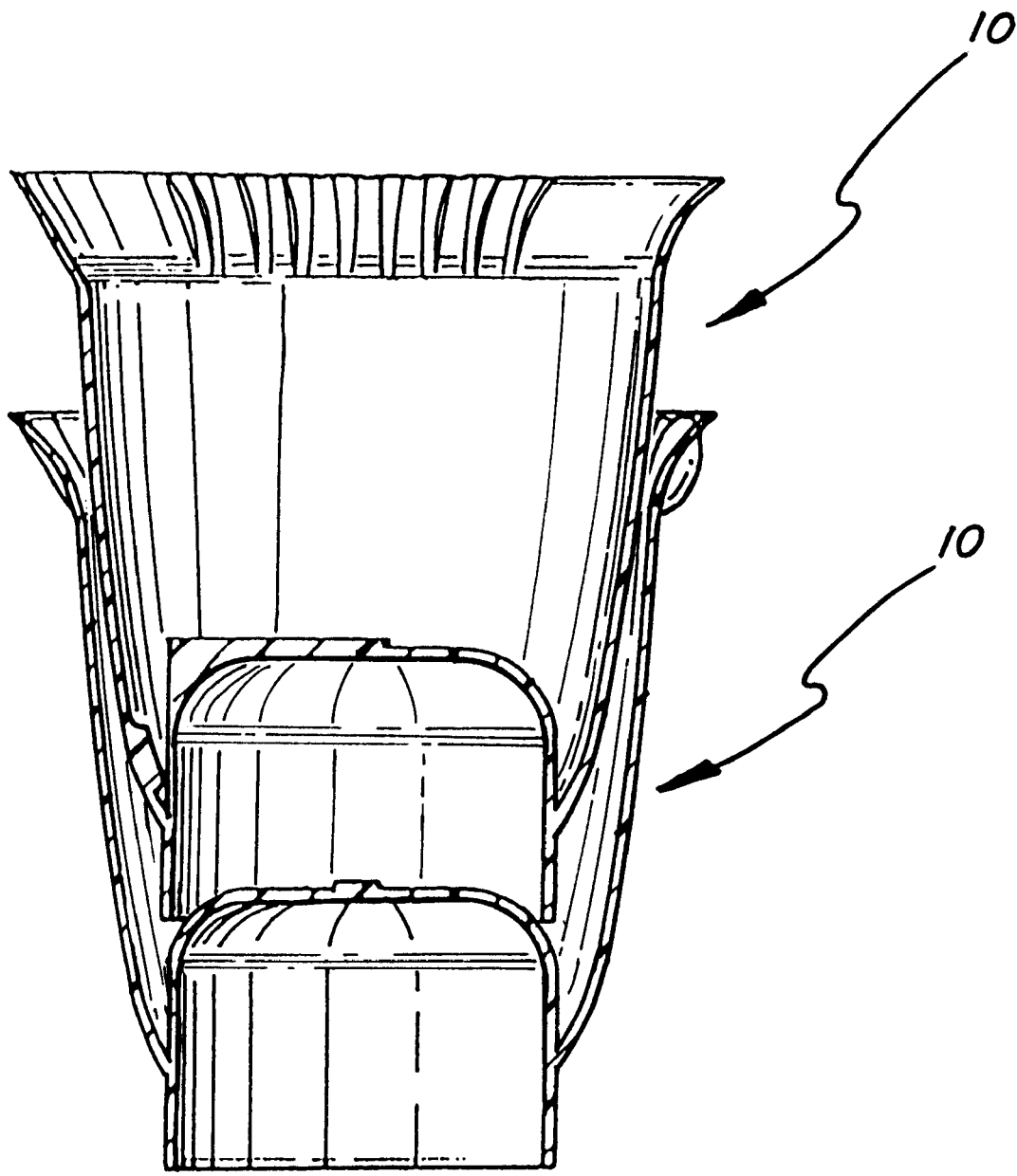

FIG. 11 is a cross-sectional view of a pair of vessels of the present invention to show the stacking arrangement of such vessels. When the vessels are stacked or nested as shown in FIG. 11, the bottom end of the raised portion 60 of the upper vessel will rest upon and engage the top end of the raised portion 60 of the lower vessel. The stacking or nesting arrangement minimizes jamming and unwanted side wall interference between adjacent containers. Wine vessels with long stems do not allow large numbers of vessels to be stacked, transported or stored in compact spaces, such as store shelves. By removing the long stem and replacing it with the collar stem having a pinch ring, the vessel can be easily stacked, transported, and stored in compact spaces.

Although the present invention has been described in considerable detail with reference to certain preferred versions thereof, other versions of the invention are possible. Therefore, the scope of the appended claims should not be limited to the description of the preferred versions contained herein.

What is claimed is:

1. A unitary vessel comprising:
    a bottom portion having an interior surface and an exterior surface;
    a side wall extending upwardly and outwardly from the bottom portion, the side wall having an interior surface and an exterior surface, and the side wall terminating in an open top having an outwardly extending rim, wherein the rim comprises:
        (a) a curved portion with a plurality of radially extending ridges,
        (b) an angled edge portion, and
        (c) a curved pouting lip portion;
    a raised portion formed in the bottom portion of the vessel and projecting upwardly into the interior of the vessel;
    a platform portion formed on the raised portion; and,
    at least one radially projecting rib integral with the interior surface of the side wall and positioned opposite the platform portion, wherein the platform portion and the rib are designed to maximize the mixing of a liquid inside the vessel.

2. The vessel of claim 1 wherein the vessel is adapted for use by an individual for tasting, examining, and consuming liquids, wherein the liquids are selected from the group comprising wine, tea, and coffee.

3. The vessel of claim 1 wherein the vessel is of a size and shape for aligning the vessel in a stacked and nested position with an identical vessel.

4. The vessel of claim 1 wherein the vessel comprises a clear plastic material having a substantially uniform thickness, and wherein the plastic material is recyclable and sturdy.

5. The vessel of claim 4 wherein the plastic material is selected from the group comprising polycarbonate, polystyrene, and macralon.

6. The vessel of claim 1 wherein the vessel has a volume capacity in the range of from one ounce to sixteen ounces.

7. The vessel of claim 1 further comprising a magnifier panel on a portion of the side wall, the magnifier panel having a magnification in the range of one to eight times the original size of the liquid and its contents being viewed.

8. The vessel of claim 1 further comprising a textured panel on a portion of the side wall, the textured panel having a 600 grit surface and being designed for writing thereon with a writing instrument.

9. The vessel of claim 1 further comprising a lid adapted to fit around the exterior of the rim.

10. The vessel of claim 1 wherein the bottom portion comprises a collar stem with a hollow area for pinch holding by an individual.

11. The vessel of claim 1 wherein the radially extending ridges on the rim are of a size and shape to sufficiently aerate a liquid when the liquid is tasted by an individual.

12. The vessel of claim 1 wherein the angled edge portion on the rim is of a size and shape to direct a liquid to a top portion an individual's tongue when the liquid is tasted.

13. The vessel of claim 1 wherein the curved pouting lip portion on the rim is of a size and shape to direct a liquid to the sides of an individual's tongue and under an individual's tongue when the liquid is tasted.

14. The vessel of claim 1 wherein the raised portion is substantially in the shape of a dome having a top end and a bottom end, and wherein the top end of the raised portion is designed to measure a selected volume of a liquid inside the vessel.

15. A stackable plastic vessel adapted for use by an individual for tasting and examining liquids, the vessel comprising:
    a bottom portion having an interior surface and an exterior surface, the bottom portion forming a collar stem;
    a side wall extending upwardly and outwardly from the bottom portion, the side wall having an interior surface and an exterior surface, and the side wall terminating in an open top having an outwardly extending rim, wherein the rim comprises:
        (a) a curved portion with a plurality of radially extending ridges, wherein the radially extending ridges are of a size and shape to sufficiently aerate the liquid when the liquid is tasted;
        (b) an angled edge portion being of a size and shape to direct the liquid to a top portion of the individual's tongue when the liquid is tasted; and,
        (c) a curved pouting lip portion being of a size and shape to direct the liquid to a side and under the individual's tongue when the liquid is tasted;
    a magnifier panel on a portion of the side wall, the magnifier panel having a magnification of one to eight times the original size; and,
    a textured panel on a portion of the side wall, the textured panel having a 600 grit surface and being designed for writing thereon with a writing instrument.

16. The vessel of claim 15 wherein the liquid is wine.

17. The vessel of claim 15 wherein the plastic is selected from the group comprising polycarbonate, polystyrene, and macralon.

18. The vessel of claim 15 further comprising a lid adapted to fit around the exterior of the rim.

19. A stackable, plastic beverage tasting vessel comprising:
    a bottom portion forming a hollow, collar stem;
    a side wall extending upwardly and outwardly from the bottom portion, the side wall having an interior surface and an exterior surface, and the side wall terminating in an open top having an outwardly extending rim, wherein the rim comprises a curved portion with a plurality of radially extending ridges adapted for aerating a beverage in the vessel prior to tasting;
    a raised dome portion formed in the bottom of the vessel and projecting upwardly into the interior of the vessel adapted for measuring a desired amount of the beverage in the vessel;

a platform portion formed on a portion of the raised dome portion; and, at least one radially projecting rib integral with the interior surface of the side wall and positioned opposite the platform portion, wherein the platform portion and the rib are adapted to maximize the mixing of the beverage inside the vessel prior to tasting.

20. The vessel of claim 19 wherein the rim further comprises an angled edge portion and further comprises a curved pouting lip portion.

* * * * *